US012431630B2

(12) United States Patent
Frid et al.

(10) Patent No.: US 12,431,630 B2
(45) Date of Patent: Sep. 30, 2025

(54) WIDEBAND HORIZONTALLY POLARIZED ANTENNA

(71) Applicant: SAAB AB, Linköping (SE)

(72) Inventors: Henrik Frid, Järfälla (SE); Göran Tengstrand, Enskede (SE)

(73) Assignee: SAAB AB, Linköping (SE)

( * ) Notice: Subject to any disclaimer, the term of this patent is extended or adjusted under 35 U.S.C. 154(b) by 66 days.

(21) Appl. No.: 18/245,170

(22) PCT Filed: Sep. 9, 2021

(86) PCT No.: PCT/SE2021/050866
§ 371 (c)(1),
(2) Date: Mar. 14, 2023

(87) PCT Pub. No.: WO2022/060275
PCT Pub. Date: Mar. 24, 2022

(65) Prior Publication Data
US 2023/0291114 A1 Sep. 14, 2023

(30) Foreign Application Priority Data
Sep. 17, 2020 (SE) .................................... 2000168-1

(51) Int. Cl.
*H01Q 13/08* (2006.01)
*H01Q 1/34* (2006.01)
(Continued)

(52) U.S. Cl.
CPC ............. *H01Q 13/085* (2013.01); *H01Q 1/34* (2013.01); *H01Q 9/40* (2013.01); *H01Q 21/22* (2013.01)

(58) Field of Classification Search
CPC ........ H01Q 13/085; H01Q 1/34; H01Q 1/283; H01Q 1/3283; H01Q 1/42; H01Q 1/28;
(Continued)

(56) References Cited

U.S. PATENT DOCUMENTS

| | | | |
|---|---|---|---|
| 3,453,628 | A | 7/1969 | Dolan |
| 4,083,050 | A | 4/1978 | Hall |

(Continued)

FOREIGN PATENT DOCUMENTS

| | | | |
|---|---|---|---|
| DE | 102017101676 A1 | 8/2018 | |
| JP | H06-112732 A | 4/1994 | |

(Continued)

OTHER PUBLICATIONS

International Search Report and Written Opinion mailed Sep. 16, 2021 for International Application No. PCT/SE2021/050866, 12 pages.

(Continued)

*Primary Examiner* — Seokjin Kim
(74) *Attorney, Agent, or Firm* — Sage Patent Group

(57) ABSTRACT

The disclosure relates to an antenna arrangement, including an antenna mounted inside a radome. The antenna arrangement further includes a mounting arrangement arranged to mount the antenna arrangement to an antenna platform. The antenna is a tapered slot antenna, the radome has an aerodynamic shape, and the mounting arrangement includes two antenna fastening means and an antenna radio frequency connector arranged to interact with corresponding antenna platform fastening means and an antenna platform radio frequency connector arranged on the antenna platform.

7 Claims, 6 Drawing Sheets

(51) Int. Cl.
*H01Q 9/40* (2006.01)
*H01Q 21/22* (2006.01)

(58) Field of Classification Search
CPC .. H01Q 1/32; H01Q 1/27; H01Q 9/40; H01Q 21/22; H01Q 21/08
See application file for complete search history.

(56) References Cited

U.S. PATENT DOCUMENTS

| | | | | |
|---|---|---|---|---|
| 4,132,995 | A | 1/1979 | Monser | |
| 5,220,330 | A * | 6/1993 | Salvail | H01Q 13/085 343/705 |
| 6,404,377 | B1 * | 6/2002 | Lee | H01Q 13/085 343/705 |
| 7,009,572 | B1 * | 3/2006 | Homer | H01Q 13/085 343/771 |
| 7,327,320 | B2 * | 2/2008 | Dejean | H01Q 1/42 343/702 |
| 7,633,451 | B2 * | 12/2009 | Robin | H01Q 1/28 343/705 |
| 8,599,095 | B2 * | 12/2013 | Wu | F41H 5/0428 343/872 |
| 8,648,759 | B2 * | 2/2014 | Wang | H01Q 1/286 343/820 |
| 9,000,991 | B2 * | 4/2015 | Ramberg | H01Q 13/085 343/793 |
| 10,103,428 | B2 * | 10/2018 | Ozaki | H01Q 1/283 |
| 10,103,444 | B2 * | 10/2018 | Wangsvick | H01Q 1/286 |
| 10,153,561 | B2 * | 12/2018 | Boyer | H01Q 9/16 |
| 10,230,172 | B1 | 3/2019 | Wolf et al. | |
| 10,615,492 | B2 | 4/2020 | Kerselaers et al. | |
| 10,644,385 | B1 * | 5/2020 | Greenwood | H01Q 1/287 |
| 11,258,167 | B1 * | 2/2022 | Graf | H01Q 1/287 |
| 11,774,579 | B1 * | 10/2023 | Wang | G01S 13/865 324/329 |
| 2003/0090427 | A1 * | 5/2003 | Solberg, Jr. | H01Q 7/08 343/787 |
| 2007/0210972 | A1 | 9/2007 | Robin et al. | |
| 2009/0102705 | A1 | 4/2009 | Obermeyer | |
| 2014/0145890 | A1 * | 5/2014 | Ramberg | H01Q 21/30 343/726 |
| 2014/0327577 | A1 | 11/2014 | Ozaki et al. | |
| 2018/0013203 | A1 | 1/2018 | Wangsvick | |
| 2018/0109005 | A1 * | 4/2018 | Milano | H01Q 21/0075 |
| 2022/0352622 | A1 * | 11/2022 | Choudhury | H01Q 3/242 |
| 2023/0361454 | A1 * | 11/2023 | West | B64C 1/36 |

FOREIGN PATENT DOCUMENTS

| | | | |
|---|---|---|---|
| JP | H10-126130 | A | 5/1998 |
| JP | 2004-513550 | A | 4/2004 |
| JP | 2009-049695 | A | 3/2009 |
| JP | 2016-539606 | A | 12/2016 |
| JP | 2017184008 | A | 10/2017 |
| WO | 2016026750 | A1 | 2/2016 |
| WO | 2019143275 | A1 | 7/2019 |

OTHER PUBLICATIONS

Extended European Search Report mailed Sep. 2, 2024 for European Patent Application No. 21869856.1, 12 pages.
Office Action mailed Apr. 7, 2025 for Japanese Patent Application No. 2023-516120, 11 pages (includes English translation).
Office Action mailed Apr. 25, 2025 for United Arab Emirates Patent Application No. P6000583/2023, 8 pages.

* cited by examiner

X
Y
Z
1
7a 1
1
1
7a
8

WIDEBAND HORIZONTALLY POLARIZED ANTENNA

CROSS-REFERENCE TO RELATED APPLICATIONS

This application is a 35 U.S.C § 371 national stage application for International Application No. PCT/SE2021/050866, entitled "WIDEBAND HORIZONTALLY POLARIZED ANTENNA", filed on Sep. 9, 2021, which claims priority to Swedish Patent Publication No. 2000168-1, filed on Sep. 17, 2020, the disclosures and contents of which are hereby incorporated by reference in their entireties.

TECHNICAL FIELD

The disclosure relates to an antenna arrangement comprising an antenna mounted inside a radome. The antenna arrangement further comprises a mounting arrangement attached to the radome arranged to mount the antenna arrangement to an antenna platform. The disclosure also relates to a method for receiving and transmitting radio-frequency signals with horizontal polarization and propagation perpendicular to a direction an antenna platform is moving.

BACKGROUND ART

Vehicle-mounted radio-frequency (RF) antennas can be used for a variety of applications. One application area is radar applications, such as air and terrestrial traffic control, marine radars to locate landmarks and other ships, radar astronomy and various defence applications.

Another application is electronic warfare (EW), where RF antennas uses the electromagnetic (EM) spectrum to control the spectrum, attack an enemy, or impede enemy assaults. The purpose of electronic warfare is to deny the opponent the advantage of, and ensure friendly unimpeded access to, the EM spectrum. EW can be applied from air, sea, land, and/or space based platforms either manned and unmanned, and can target humans, communication, radar, or other assets.

The most common vehicle-mounted antenna for very high frequency (VHF) and ultra-high frequency (UHF) radio frequencies is the blade antenna. Inside a radome, a monopole antenna such as a blade antenna is placed. It is well known that the monopole antenna has a "doughnut-shaped" radiation pattern around the z-axis, such that there is full coverage in a xy-plane but no coverage in the ±z direction; see for instance C. A. Balanis, "Antenna Theory, analysis and design", ISBN 978-1118642061. The polarization of the blade antenna is in the z-direction.

Thus, vehicle-mounted blade antennas can be used to achieve vertical polarization with full coverage 360° in a horizontal plane relative a vehicle, such as an aircraft. The horizontal polarization, on the other hand, can mainly be used in the forward or aft directions when using conventional blade antennas, but not to the sides of the vehicle.

In the example of an aircraft, one method to achieve horizontal polarization relative a horizontal plane of an aircraft is to mount a horizontally polarized dipole a certain distance over the aircraft metallic fuselage. This approach has two challenges. Firstly, a quarter wavelength distance from the metallic ground plane is needed, which is challenging due to the long wavelength at VHF frequencies. Another challenge is that there is poor radiation efficiency in the horizontal plane, due to the image current in the ground plane.

One method to reduce the distance over the ground plane was presented in Daniel Sievenpiper et. al., "High-Impedance Electromagnetic Surfaces with a Forbidden Frequency Band," IEEE Transactions on Antennas and Propagation, Volume 47, Issue 11, November 1999. However, this configuration has to the applicant's knowledge not reached commercial use for aircraft applications due to the narrow bandwidth and the size requirements for the high impedance ground plane.

Another solution was presented in Luca Scorrano et. al., "Dual-polarization DF Array for airborne SIGINT in VHF/UHF bands," Proceedings of the 44th European Microwave Conference, 8-10 Oct. 2014. Similar to the blade antenna, this antenna is narrowband, thus resulting in insufficient radiation efficiency at the lower frequencies for certain applications, and the performance is limited by the distance from the ground plane.

Another method to achieve horizontal polarization to the side of the aircraft would be to place patch antennas on the side of the aircraft structure. However, patch antennas require a relatively large area on the side of the aircraft, while being narrowband.

In WO 2019/143275 A1, an antenna installation with log-periodic antennas is disclosed. With this configuration, a horizontal polarization can be achieved, but only in the forward or aft directions relative the aircraft.

There is thus a need for an improved antenna arrangement aimed to provide reception and transmission of RF waves with horizontal polarization, with high radiation efficiency over a wide bandwidth.

SUMMARY

An objective of this disclosure is to provide an antenna arrangement that addresses the problems described above. This object is achieved by the technical features contained in the characterizing portion of independent claims 1 and 7. The dependent claims contain advantageous embodiments, further developments and variants of the antenna arrangement.

For reference, a local coordinate system x, y, z (lowercase) is a local coordinate system used for the antenna arrangement, where the x-axis is the longitudinal axis, the y-axis is the transverse axis and the z-axis is the vertical axis. A coordinate system X, Y, Z (uppercase) is used for the antenna platform on which the antenna arrangement is installed, where the X-axis is the vertical axis, the Y-axis is the transverse axis and the Z-axis is the longitudinal axis.

The disclosure relates to an antenna arrangement, comprising an antenna mounted inside a radome. The antenna arrangement further comprises a mounting arrangement arranged to mount the antenna arrangement to an antenna platform. The antenna arrangement is characterized by that the antenna is a tapered slot antenna, that the radome has an aerodynamic shape, and that the mounting arrangement comprises two antenna fastening means and an antenna radio-frequency connector arranged to interact with corresponding antenna platform fastening means and an antenna platform radio frequency connector arranged on the antenna platform.

The most common installation configuration for blade antennas are vertical installation, at either the top or the bottom surfaces of an aircraft, i.e., with the z-axis of the antenna aligned with the X-axis of the antenna platform.

With this configuration, full RF coverage is achieved in the horizontal Y-Z-plane, with vertical polarization. This is a common type of installation for radio communication antennas.

When blade antennas are installed with the z-axis in the horizontal Y-Z-plane, aligned with the Y-axis of the antenna platform, a horizontal polarization is achieved. However, due to the doughnut-shaped radiation pattern, this will only result in coverage in the forward and aft directions relative to the aircraft. Coverage to the sides of the antenna platform, such as an aircraft, can therefore not be achieved with this antenna configuration. This configuration can be used for Instrument Landing System (ILS), where a horizontal polarization in the forward direction is needed.

However, for electronic warfare applications, having horizontal polarization and radiation along the positive and negative Y-axes, or propagation perpendicular to the direction an antenna platform onto which the antenna arrangement is attached is moving, would be very beneficial. One example application for the antenna arrangement is for an airborne electronic warfare platform travelling in racetrack flight pattern where the antenna arrangement can be used for both stand-off jamming and surveillance of possible threats.

This antenna arrangement used in the disclosure is a tapered slot antenna mounted in a radome, such that the mechanical and aerodynamic design resembles a previously known blade antenna. Thus, the outer appearance of the antenna arrangement will be similar to a blade antenna. Since the tapered slot antenna is an end-fire antenna, the radiation pattern will have a maximum in the z-direction, and be polarized along the y-axis. The bandwidth and gain of the tapered slot antenna are both greater than the bandwidth and gain of the blade antenna.

The antenna arrangement according to the disclosure fulfils the following specification:

1. Horizontal polarization, with coverage in the z-direction of the antenna arrangement such that coverage to the side of an antenna platform as an airborne vehicle, a land vehicle or surface vehicle can be achieved.
2. An antenna having a large bandwidth
3. The antenna arrangement provided is easy to install
4. The antenna arrangement provided has an aerodynamic profile
5. The antenna arrangement provided has a high radiation efficiency and low return loss Any tapering function can be used for the tapered slot antenna, such as for example an exponential tapered slot antenna, a linear tapered slot antenna, a continuous-width slot antenna, dual exponentially tapered slot antenna, a stepped slot antenna, a step-constant tapered slot antenna, a tangential tapered slot antenna, a parabolic tapered slot antenna, a linear-constant tapered slot antenna, an exponential-constant tapered slot antenna or a broken-linear tapered slot antenna.

Depending on the desired characteristics of the antenna in the antenna arrangement, a variety of tapered slot configurations can be selected.

The material of the radome may be one of e.g. plastic, composite glass, fibreglass or quartz.

The material of the radome may become part of the antenna arrangement. Depending on desired characteristics of the antenna arrangement, the permittivity of the material can be adapted depending on the material chosen for the radome. The size of the antenna can for instance be adapted by adapting the permittivity of the radome.

The antenna platform may be an airborne vehicle, for example an airplane or an unmanned aerial vehicle, wherein the antenna arrangement is arranged on an essentially vertical surface of the airborne vehicle such that the antenna arrangement is arranged to receive and transmit radio frequency signals that are horizontally polarized and propagates perpendicular to the direction the antenna platform is moving.

As indicated above, an antenna arrangement according to the disclosure is beneficial for electronic warfare platforms such as an airplane travelling in a racetrack flight pattern where it can be used for both stand-off jamming and surveillance of possible threats. The unmanned aerial vehicle may be an unmanned combat aerial vehicle.

The antenna platform may also be a manned or unmanned land vehicle. The antenna platform may also be a manned or unmanned surface vehicle, for example a manned or unmanned boat or naval ship.

Other types of electronic warfare platforms such as armoured vehicles and surface vehicles such as ships and boats can also take advantage of an antenna platform according to the disclosure. The antenna platforms may be manned or unmanned, i.e. unmanned ground vehicle or an unmanned surface vehicle.

The antenna and platform radio frequency connectors may be SubMiniature version A co-axial connectors.

In order to have an easy installation, the antenna arrangement and antenna platform comprises matching radio frequency connectors. One example of radio frequency connector is a SubMiniature version A (SMA) co-axial connectors, which provides ease of use and provides good characteristics for the RF used. Alternatives to the SMA connectors are for example SubMiniature version C (SMC) co-axial connectors, Bayonet Neill-Concelman (BNC) connectors, Threaded Neill-Concelman (TNC) connectors or type-N connectors.

The disclosure also relates to an array antenna, comprising a multitude of antenna arrangements as described above. The array antenna is formed by that the antenna arrangements are arranged essentially along the same linear extension of an antenna platform, or in a pattern where at least some of the antenna arrangements are separated along the Z-axis of the antenna platform.

Multiple antenna arrangements can be mounted for instance along the length of an aircraft to form an array antenna. An array antenna can be used for direction finding (DF) in electronic surveillance (ES) and/or to achieve high gain for electronic attack (EA).

The disclosure also relates to a method for receiving and transmitting signals with horizontal polarization and radiation along the positive and negative Y-axes, wherein the method comprises:

providing an antenna arrangement by mounting a tapered slot antenna inside an aerodynamically shaped radome, further providing the antenna arrangement with a mounting arrangement comprising two antenna fastening means and one antenna radio frequency connector, arranging, on a vertical surface of an antenna platform, antenna platform fastening means and antenna platform radio frequency connector arranged to interact with the antenna fastening means and antenna radio frequency connector, attaching the antenna arrangement to the antenna platform and connecting the antenna arrangement to a control system through the antenna radio frequency connector and the antenna platform radio frequency connector.

The method provides the advantages as described above.

DETAILED DESCRIPTION

In the figures, an antenna is defined by a coordinate system x, y, z (lowercase), where the x-axis is the longitudinal axis, the y-axis is the transverse axis and the z-axis is the vertical axis. An antenna platform is defined by a coordinate system X, Y, Z (uppercase), where the X-axis is the vertical axis, the Y-axis is the transverse axis and the Z-axis is the longitudinal axis.

Figure 1:
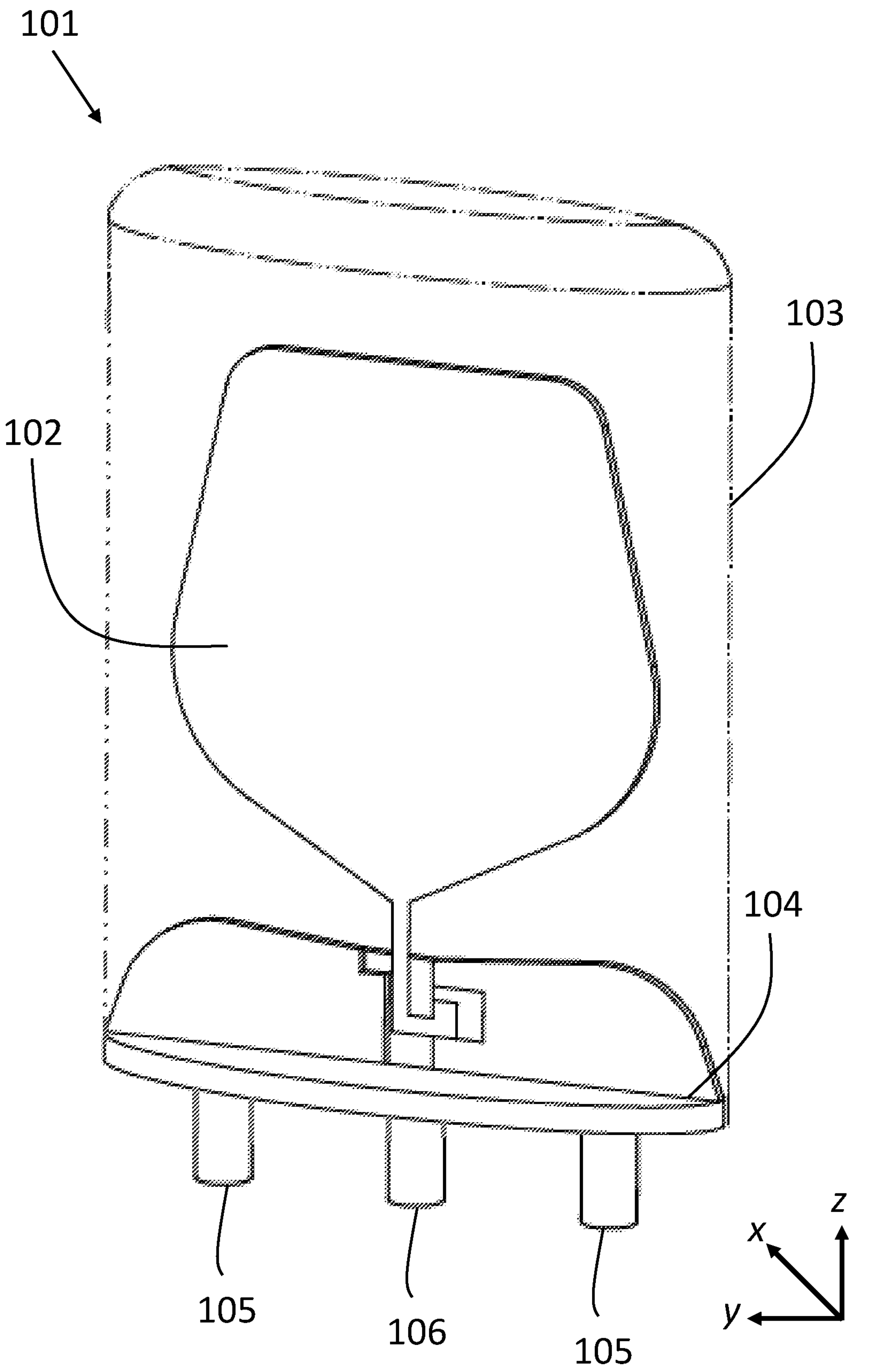
FIG. 1 schematically shows a prior art antenna arrangement.

FIG. 1 schematically shows a prior art blade antenna arrangement 101. The prior art antenna arrangement 101 comprises a shaped monopole antenna 102 placed inside a radome 103. The radome is normally opaque for optical frequencies but not for RF frequencies and its borders are therefore outlined with dash-double-dot lines. The blade antenna 102 is mounted on a ground plane 104 and is arranged to be mechanically connectable by means of two antenna fastening means 105 and electronically connectable by means of an antenna radio frequency connector 106 to an antenna platform such as an aircraft (not shown).

The prior art antenna arrangement 101 is a common aircraft-mounted antenna for VHF and UHF radio frequencies and is described in the background. Advantages of a blade antenna 102 are the ease of installation exemplified by the two screws acting as antenna fastening means 105 shown in FIG. 1, and the aerodynamic profile of the radome 103. However, the blade antenna 102 does not provide horizontal polarization or propagation perpendicular to the direction an antenna platform onto which the antenna arrangement is attached is moving. For simplicity, the antenna feed and other known details required for the functioning of the antenna are not shown.

Figure 2:
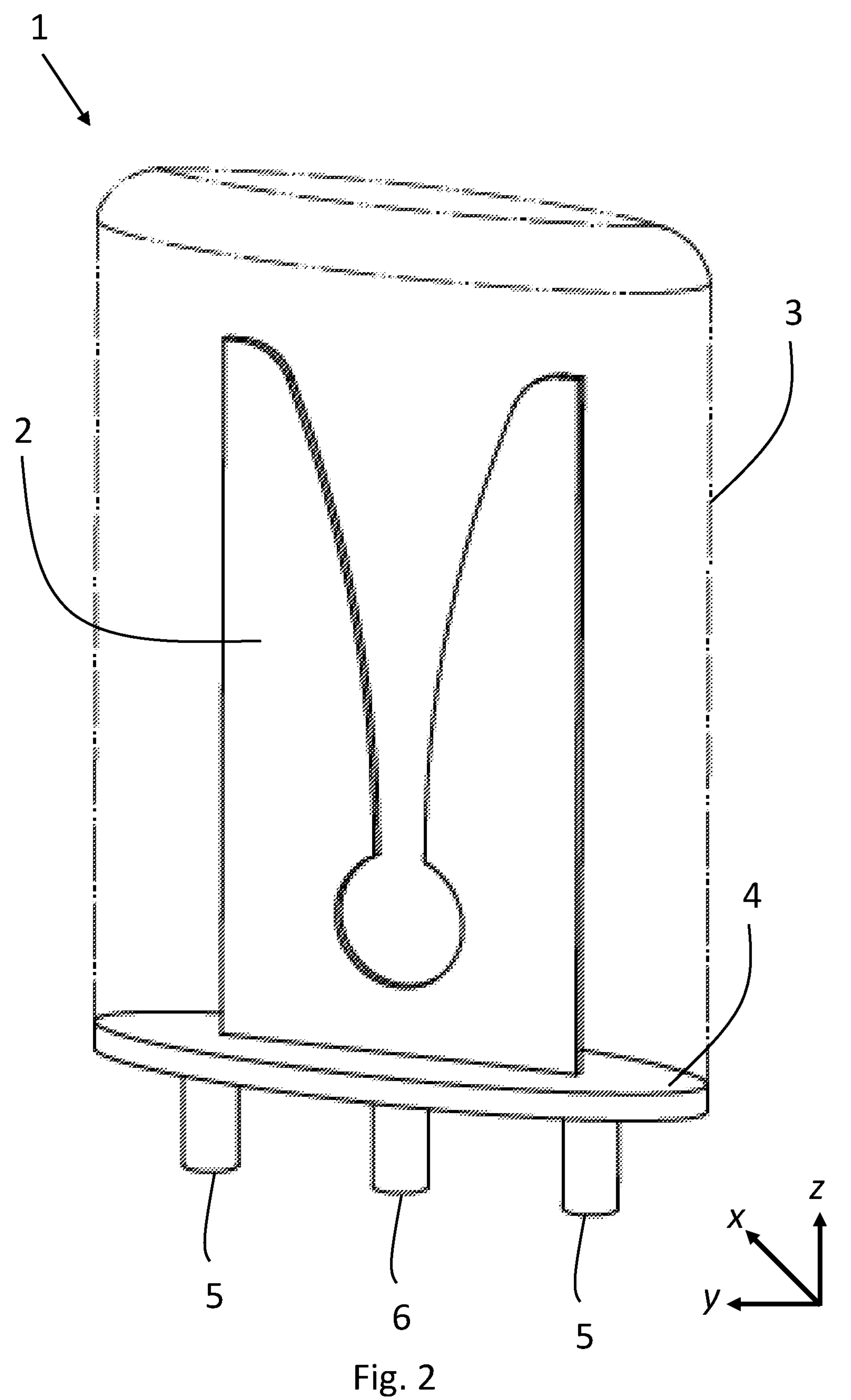
FIG. 2 schematically shows an antenna arrangement according to the disclosure, FIG. 3*a* schematically shows an antenna platform in the form of an airplane with an antenna arrangement according to the disclosure, FIG. 3*b* schematically shows an antenna platform in the form of an airplane with an array antenna according to the disclosure, FIG. 4 schematically shows an antenna platform in the form of an airplane travelling in a racetrack flight pattern, FIG. 5 schematically shows an antenna platform in the form of a ground vehicle with an antenna arrangement according to the disclosure, FIG. 6 schematically shows an antenna platform in the form of a surface vehicle with an antenna arrangement according to the disclosure.

FIG. 2 schematically shows an antenna arrangement 1 according to the disclosure. In the antenna arrangement 1 in FIG. 2, the blade antenna 102 of FIG. 1 has been replaced by a tapered slot antenna 2 mounted on a ground plane 4. Further, a radome 3 has an aerodynamic shape. A mounting arrangement comprises two antenna fastening means 5 and an antenna radio frequency connector 6 arranged to interact with corresponding antenna platform fastening means (not shown) and an antenna platform radio frequency connector (not shown) arranged on an antenna platform (not shown).

Since the tapered slot antenna 2 is an end-fire antenna, the radiation pattern will have a maximum in the z-direction, and be polarized along the y-axis. The bandwidth and realized gain or radiation efficiency of the tapered slot antenna 2 are both greater than those of the blade antenna leading to a number of advantages over the prior art antenna arrangement 1 of FIG. 1.

A number of variations of tapered slot antennas 2 can be used with the antenna arrangement 1 according to the disclosure depending on desired characteristics. For simplicity, the antenna feed and other known details required for the functioning of the antenna are not shown.

Figures 3A, 3B:
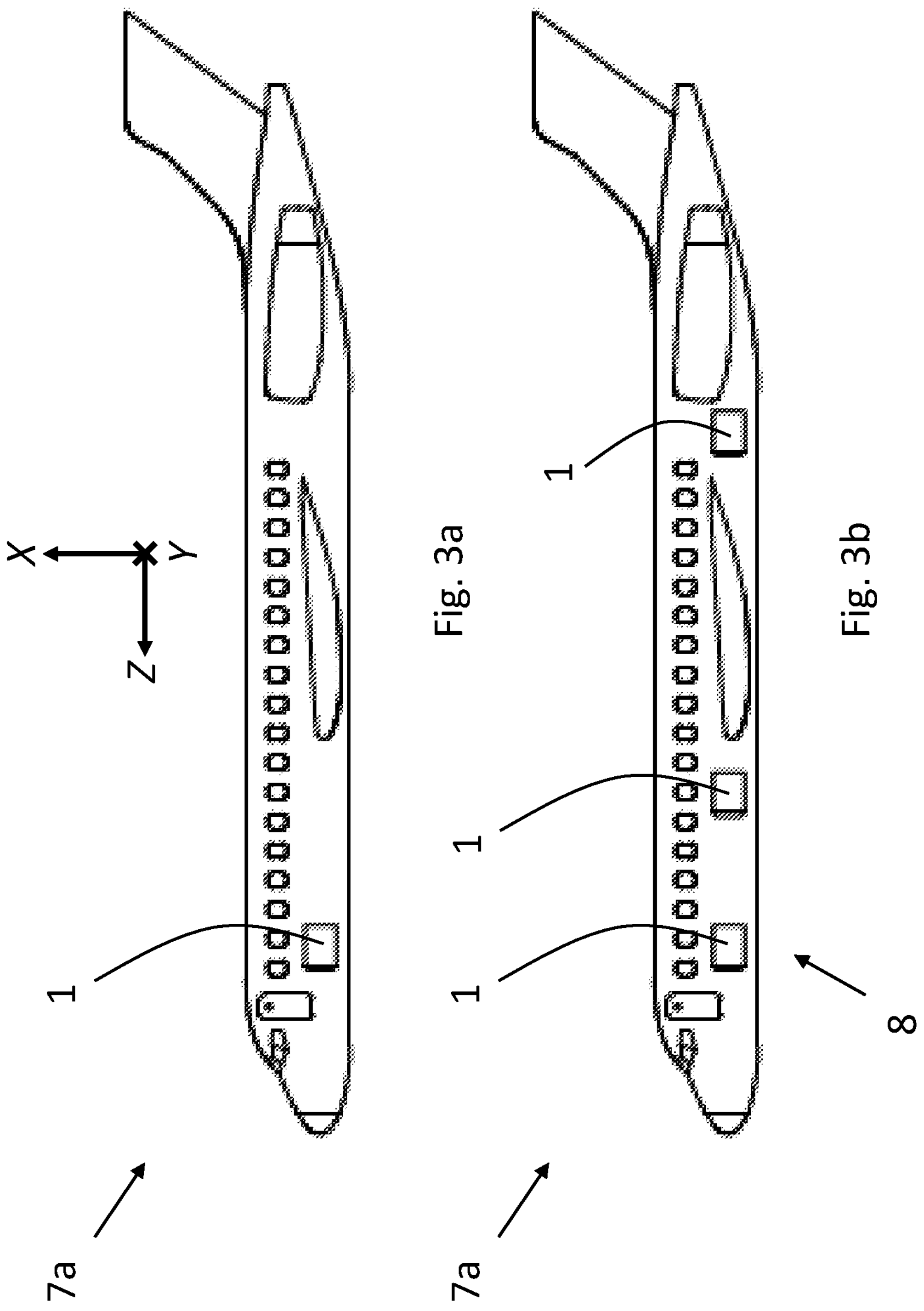

FIG. 3*a* schematically shows an antenna platform 7*a* in the form of an airplane with an antenna arrangement 1 according to the disclosure. FIG. 3*a* shows an example placement of an antenna arrangement 1 on an aircraft in order to utilize the advantages provided by the antenna arrangement 1, i.e. a radiation pattern in the z-direction of the tapered slot antenna 2 with polarization along the y-axis.

FIG. 3*b* schematically shows an antenna platform 7*a* in the form of an airplane with an array antenna 8 according to the disclosure. Multiple antenna arrangements 1 can be installed along a length of an aircraft to form an array antenna 8 according to FIG. 3*b*. An array antenna 8 can be used for direction finding (DF) in electronic surveillance (ES), and for achieving high gain for electronic attack (EA).

Figure 4:
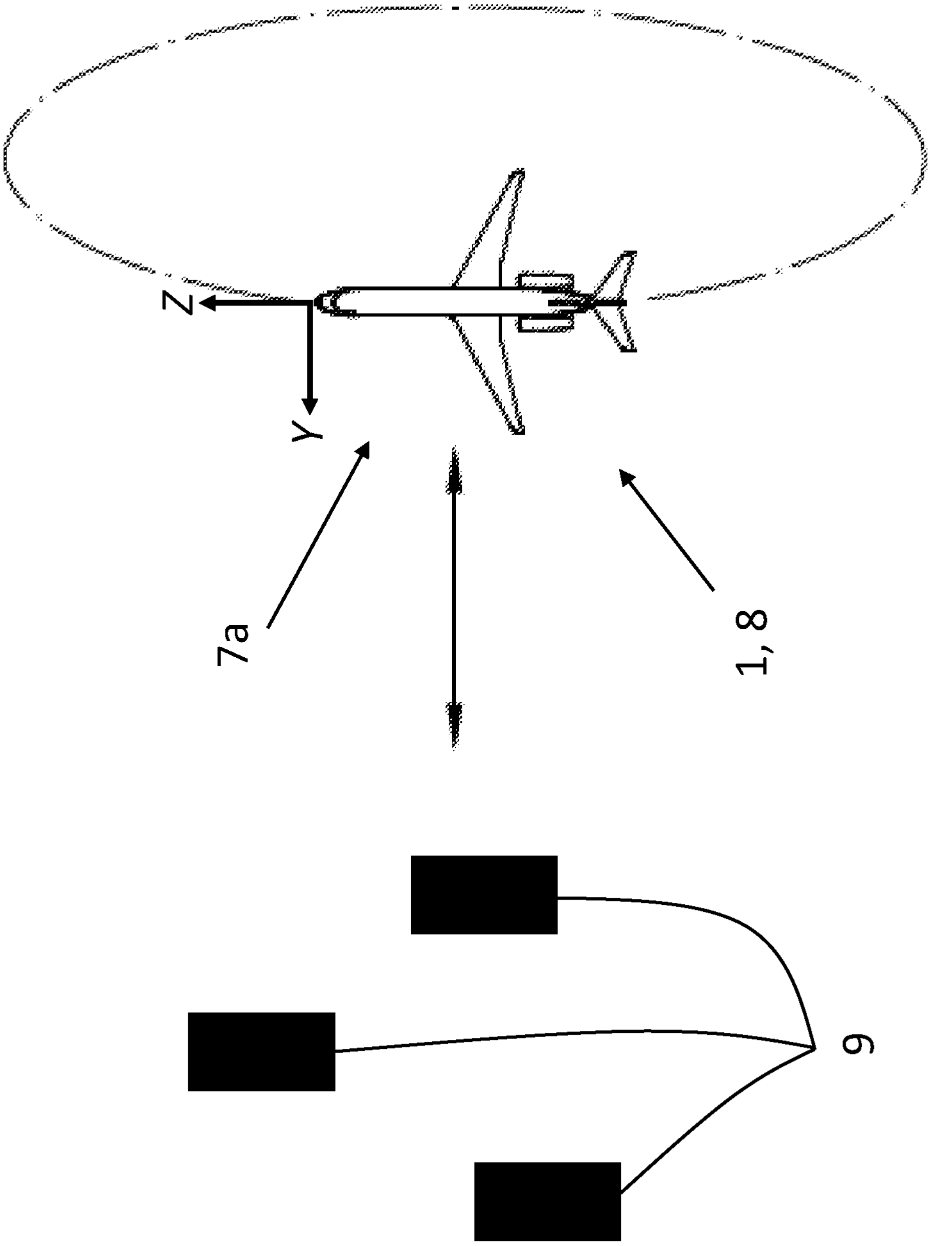

FIG. 4 schematically shows an antenna platform 7*a* in the form of an airplane travelling in a racetrack flight pattern. The antenna arrangement 1 and/or array antenna 8 is beneficial for electronic warfare (EW) and signals intelligence aircrafts. Antenna arrangements 1 satisfying the criteria 1-5 above are of interest for race-track flight, as they are used for both stand-off jamming and surveillance. In FIG. 4, a number of threats 9 are displayed as being in range of the antenna arrangement 1 and/or array antenna 8 and stand-off jamming and/or surveillance can be performed on the threats 9 as indicated by the arrow. The arrow symbolizes signals reception and transmission.

Figure 5:
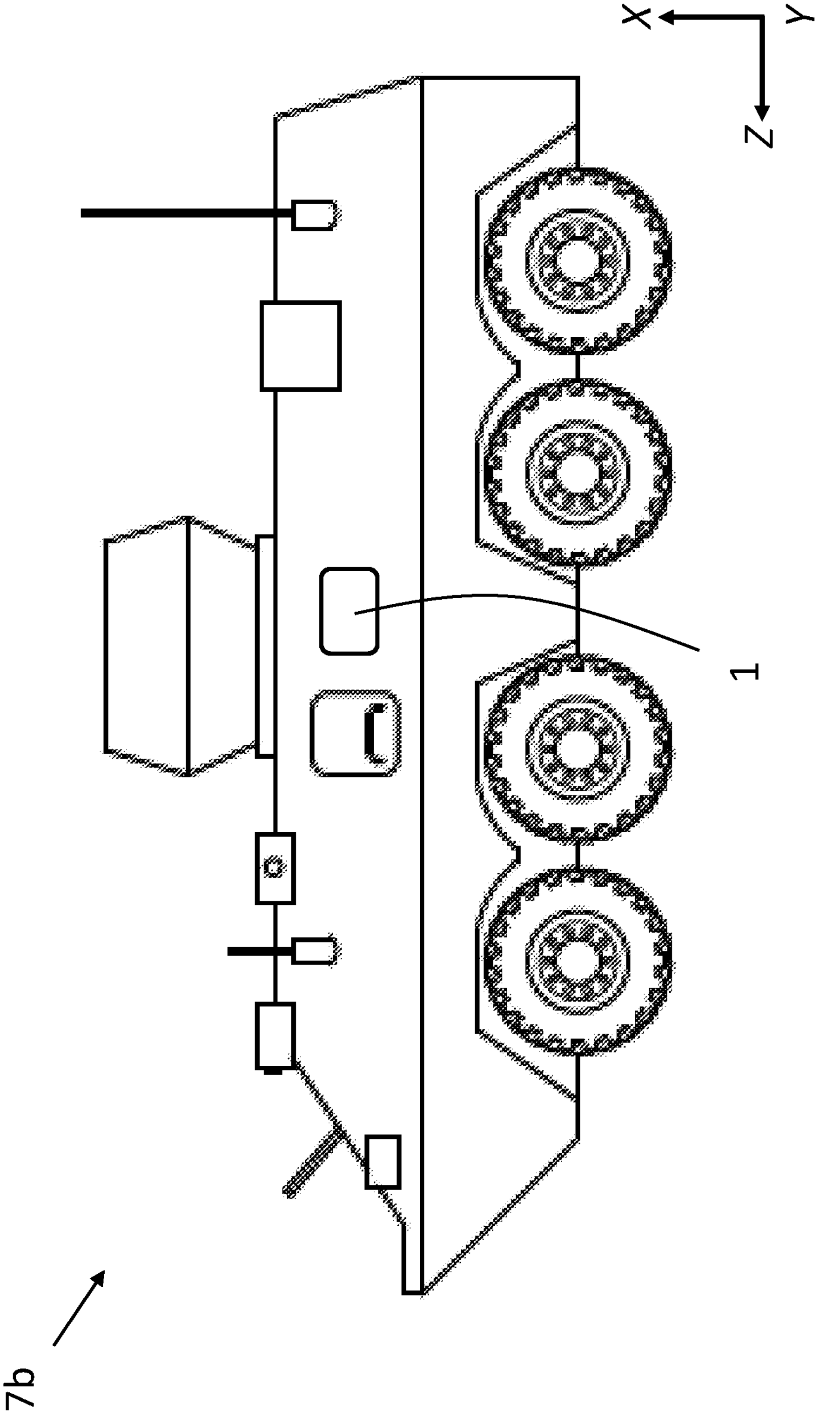

FIG. 5 schematically shows an antenna platform 7*b* in the form of a ground vehicle with an antenna arrangement 1 according to the disclosure. Similar to the airborne antenna platform 7*a* of FIG. 4, a land based antenna platform 7*b* can benefit from having one or more antenna arrangements 1 installed as described above. Although only one antenna arrangement is shown, it is to be understood that the antenna platform 7*b* may alternatively comprise a linear antenna array 8 according to FIG. 3*b*.

Figure 6:
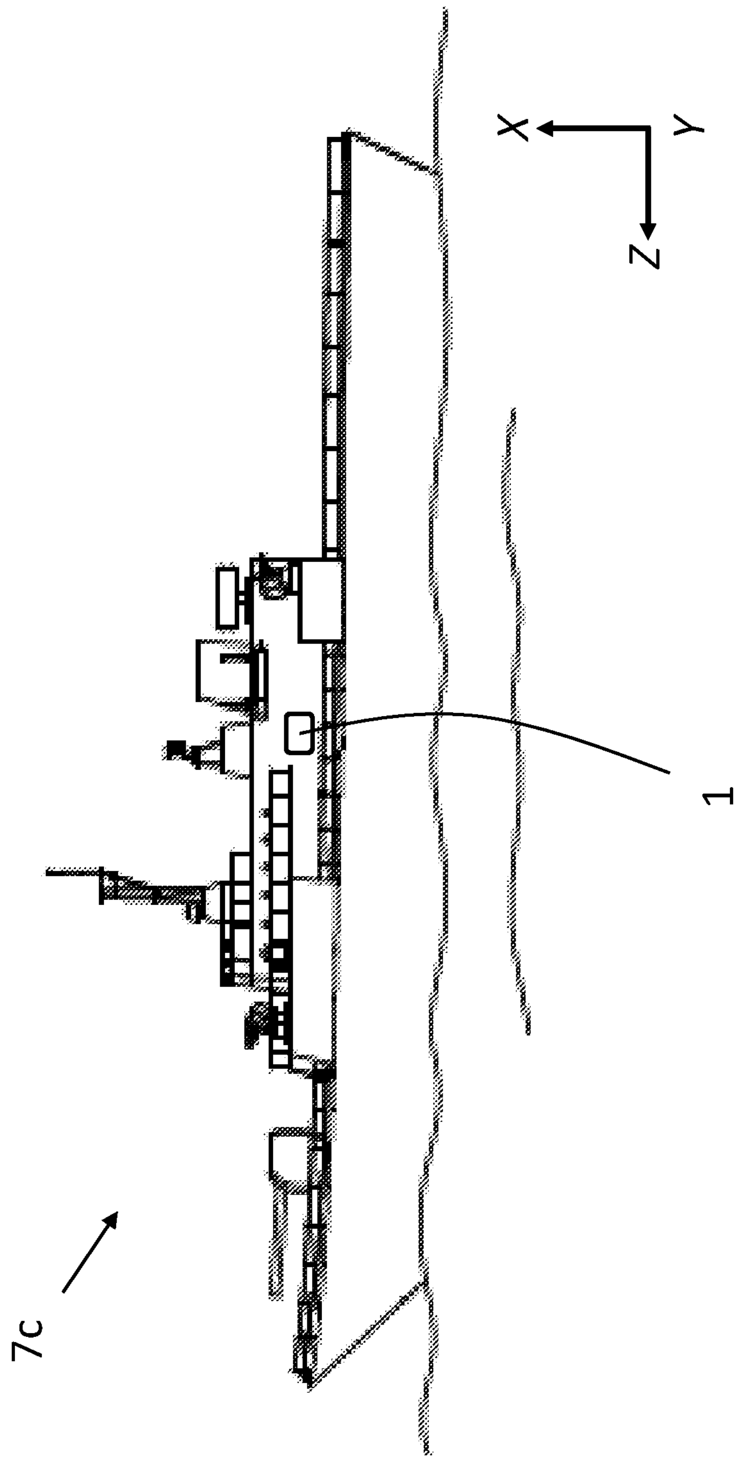

FIG. 6 schematically shows an antenna platform 7*c* in the form of a surface vehicle with an antenna arrangement 1 according to the disclosure. Similar to the airborne antenna platform 7*a* of FIG. 4 and the land based antenna platform 7*b* of FIG. 5, a surface vehicle can benefit from having one or more antenna arrangements 1 installed as described above. Although only one antenna arrangement is shown, it is to be understood that the antenna platform 7*c* may alternatively comprise a linear antenna array 8 according to FIG. 3*b*.

In other words, the antenna platforms 7*a*, 7*b*, 7*c* are suitable for implementation of a method for receiving and transmitting radio-frequency signals with horizontal polarization and propagation perpendicular to a direction an antenna platform (7*a*, 7*b*, 7*c*) is moving. The method comprises:

providing an antenna arrangement 1 by mounting a tapered slot antenna 2 inside an aerodynamically shaped radome 3, further providing the antenna arrangement 1 with a mounting arrangement comprising two antenna fastening means 5 and one antenna radio frequency connector 6, arranging, on a vertical surface of an antenna platform 7*a*, 7*b*, 7*c*, antenna platform 7*a*, 7*b*, 7*c* fastening means and antenna platform radio frequency connector arranged to interact with the antenna fastening means 5 and antenna radio frequency connector 6, attaching the antenna arrangement 1 to the antenna platform 7*a*, 7*b*, 7*c* and connecting the antenna arrangement 1 to a control system through the antenna radio frequency connector 6 and the antenna platform radio frequency connector.

The control system is an RF system, for instance an electronic warfare system and/or a radar system.

In the context of the disclosure, aerodynamic shape means that the shape of the radome 3 reduces drag from passing through the air compared to a shape that is not aerodynamic. Examples of radomes 3 with aerodynamic shapes can be seen in U.S. Pat. No. 4,072,952 A and are available from a number of blade antenna manufacturers.

The tapered slot antenna 2 can be printed or etched on a substrate with microstrip feed, printed or etched on a dielectric substrate with stripline feed, made of one layer of metal with microstrip 5 feed, printed or etched on a substrate with differential feed, made of one layer of metal with differential feed. The stepped slot antenna is also known as notch element.

As will be realised, the invention is capable of modification in various obvious respects, all without departing from the scope of the appended claims. Accordingly, the drawings and the description are to be regarded as illustrative in nature, and not restrictive.

The invention claimed is:

1. An antenna arrangement, comprising an antenna mounted inside a radome, a mounting arrangement attached to the radome arranged to mount the antenna arrangement to an antenna platform, wherein:

the antenna is a tapered slot antenna, the radome has an aerodynamic shape, and the mounting arrangement comprises two antenna fastening means and an antenna radio frequency connector arranged to interact with corresponding antenna platform fastening means and an antenna platform radio frequency connector arranged on the antenna platform, wherein the antenna arrangement is arranged on an essentially vertical surface of the antenna platform such that the antenna arrangement is arranged to receive and transmit radio frequency signals that are horizontally polarized and propagates perpendicular to a direction the antenna platform is moving.

2. The antenna arrangement according to claim 1, wherein the tapered slot antenna is one of an exponential tapered slot antenna, a linear tapered slot antenna, a continuous-width slot antenna, dual exponentially tapered slot antenna, a stepped slot antenna, a step-constant tapered slot antenna, a tangential tapered slot antenna, a parabolic tapered slot antenna, a linear-constant tapered slot antenna, an exponential-constant tapered slot antenna or a broken-linear tapered slot antenna.

3. The antenna arrangement according to claim 1, wherein the material of the radome is at least one of plastic, composite glass, fibreglass or quartz.

4. The antenna arrangement according to claim 1, wherein the antenna platform is at least one of an airborne vehicle, manned or unmanned land vehicle or a manned or unmanned surface vehicle.

5. The antenna arrangement according to claim 1, wherein the antenna radio frequency connectors and platform radio frequency connectors are SubMiniature version A co-axial connectors.

6. An array antenna comprising a multitude of antenna arrangements according to claim 1, where the antenna arrangements are arranged essentially along the same linear extension of an antenna platform.

7. A method for receiving and transmitting radio-frequency signals with horizontal polarization and propagation perpendicular to a direction in which an antenna platform is moving, wherein the method comprises:

providing an antenna arrangement by mounting a tapered slot antenna inside an aerodynamically shaped radome, further providing the antenna arrangement with a mounting arrangement comprising two antenna fastening means and one antenna radio frequency connector, arranging, on a vertical surface of an antenna platform, an antenna platform fastening means and an antenna platform radio frequency connector arranged to interact with the antenna fastening means and an antenna radio frequency connector, and attaching the antenna arrangement to the antenna platform and connecting the antenna arrangement to a control system through the antenna radio frequency connector and the antenna platform radio frequency connector, wherein the antenna arrangement is arranged on the vertical surface of the antenna platform such that the antenna arrangement is arranged to receive and transmit radio frequency signals that are horizontally polarized and propagates perpendicular to a direction the antenna platform is moving.

* * * * *